United States Patent [19]
Dunn, Jr.

[11] 3,724,171
[45] Apr. 3, 1973

[54] ANNULAR FLOW CONDENSER

[75] Inventor: Wendell E. Dunn, Jr., Sydney, Australia

[73] Assignee: Wendell E. Dunn, Inc., Wilmington, Del.

[22] Filed: Apr. 29, 1971

[21] Appl. No.: 138,462

[52] U.S. Cl. ..........................55/71, 55/222, 202/185
[51] Int. Cl. ................................................B01d 53/00
[58] Field of Search.........23/87 R, 89; 55/27, 71, 72, 55/84, 220, 222, 240; 202/185

[56] References Cited

UNITED STATES PATENTS

| | | | |
|---|---|---|---|
| 2,933,373 | 4/1960 | Love et al. | 23/87 R |
| 2,762,700 | 9/1956 | Brooks | 23/87 R |
| 3,232,846 | 2/1966 | Kimmerle | 202/185 R |
| 2,447,746 | 8/1948 | Ferris et al. | 202/185 A |
| 3,683,590 | 8/1972 | Dunn, Jr. | 55/71 |

Primary Examiner—Samih N. Zaharna
Assistant Examiner—R. W. Burks
Attorney—Samuel V. Abramo

[57] ABSTRACT

This invention relates to a method of condensing iron chloride gases, particularly ferrous chloride, evolved from the chlorination of titaniferrous ores to separate the ferrous chloride from other gases evolved from the reaction, by means of annular flow condensation incorporating refluxing of the condensate along the cooling walls in a direction countercurrent to the gas flow from the reactor.

3 Claims, 1 Drawing Figure

PATENTED APR 3 1973 3,724,171
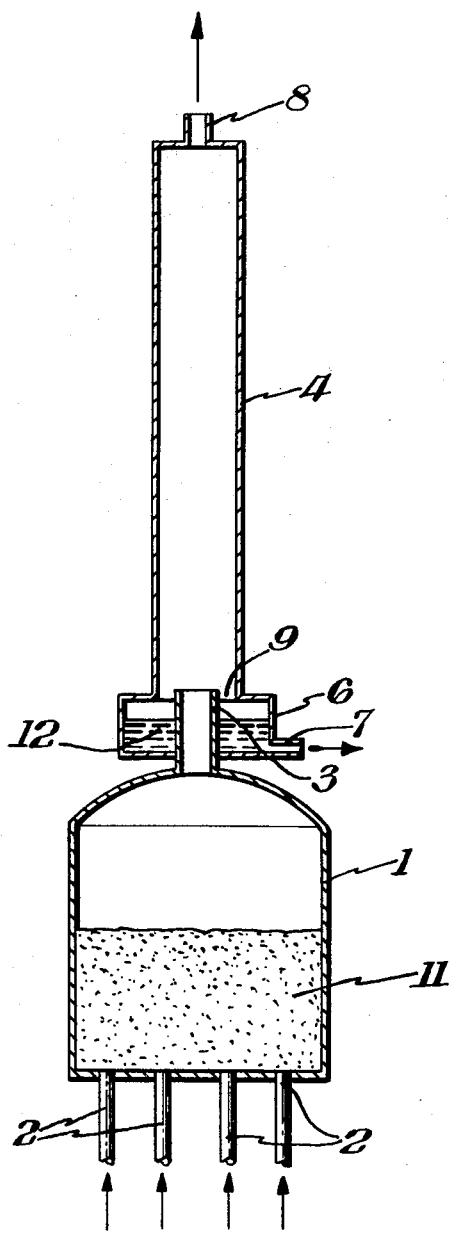
INVENTOR
Wendell E. Dunn, Jr.
BY
Samuel V. Abramo
ATTORNEY

ANNULAR FLOW CONDENSER

FIELD OF THE INVENTION

This invention describes a method for effectively condensing iron chlorides from their gaseous state without creating blockages caused by the build-up of solids or semi-liquid solids in the condensing apparatus.

SUMMARY OF THE INVENTION

Gaseous iron chlorides are formed in the production of titanium dioxide by the precess of chlorinating various titaniferrous ores at relatively high temperatures, between 750°C and 1,100°C. In order to separate the iron impurities in such processes it is usual to cool and thereby condense the higher boiling iron chlorides from the exit gas stream.

Efficient commercial operations have been hampered by the fact that ore fines and carbon dust which are entrained in the gases tend to form slimes and collect in the liquid and liquid/solid layer condensing on the walls of the condenser due to cooling and these solids quickly build-up to first reduce the efficiency of the condenser and then cause blockages. At first, these solids collect on the walls in the form of "moss" and later resemble islands in physical appearance.

For instance, it has been found that dust particles, such as finely divided coke which is entrained in the gases, tend to be wetted by the condensing iron chloride as it cools from a gas to a liquid. Ferrous chloride has a dew point of 980°C and changes to a solid at 675°C. When wetted these particles tend to stick together and with a semi-liquid surface quickly build up sticky masses along the cooling surfaces. In small pipes or tubes used for a condensing apparatus these masses of wet solids soon choke the further passage of gas necessitating a shutdown so that the apparatus can be washed and cleaned to permit its continued operation.

Because of the highly corrosive nature of iron chlorides it is desirable to avoid mechanical means, such as scrapers, to prevent their formation or to rely on the abrasion of solids or the recirculation of liquids to wash or abrade such accumulations away.

It is therefore an object of this invention to provide a simple and efficient method of cooling hot gases containing iron chlorides without creating a build-up of solids in the cooling means by allowing gravity refluxing to provide the wash. A further object of this invention is to provide means to impart to the condensed liquid as much super-heat as possible to facilitate subsequent transfer of the liquid.

Other objects and advantage of the invention will be apparent from the ensuing description and accompanying drawings.

As shown in the FIGURE a typical chlorination reactor 1 which is extremely heated and equipped with a plurality of gas inlet tubes 2 for chlorine gas in charged with an iron-containing titanium ore 11 which is fluidized by chlorine gas passed into the reactor through said inlet tubes. The hot gaseous products of the reaction exit from the reactor through the upper walls of the reactor 3 into a condenser 4 with a lower and larger receiver section 6 which holds liquid ferrous chlorine 12. A liquid discharge pipe 7 is provided to remove liquid ferrous chloride. Non-condensed gases continue upward through the condenser to an exit flue 8. The condenser and the upper walls of the reactor are sized in such a way that there is an annular receiver channel 9 provided around the top of the reactor to prevent condensed liquids from dropping back into the reactor and to insure that they will drop into receiver.

The condenser is designed to provide cooling of its walls by air or by water to insure that sufficient heat of condensation can be removed from the outside walls to insure full thermo-dynamic condensation of iron chlorides, in particular ferrous chloride since that is the principal gaseous discharge from the chlorinator. To prevent build-ups of solids the condensed ferrous chloride, which is liquid, will flow down the walls of the condenser which are disposed to aid gravity flow and wash away the dust, attrited particles and other solids, which tend to stick to the walls. A careful investigation of the inner walls of the condenser after operation indicates that there first formed a white-colored layer of ferrous chloride crystals immediately next to the wall. Next to this is a second layer of ferrous chloride solids black-colored because it is mixed with dust solids, particularly particles of finely divided coke, which appears to be in equilibrium at the melting point, 677°C. A liquid-solids layer forms on this and grows inwardly from the cooling surface, thereby causing increased pressure drop blockages. This has the appearance of moss and the temperature of its surface is near or at the ferrous chloride gas dew point. In previous experience these blockages have caused plugging and have constituted a major problem in achieving continuous operation of processes for the chlorination of titanium ores. Similar effects are found in any chloride system which forms a liquid phase. Therefore, this invention is applicable to any substance which goes through a liquid phase and particularly in the case of chlorides which have a low vapor pressure.

It has been observed in the operation of this invention that solids sometimes form in vertical mounded islands along the inside of the condenser walls and that these protuberances are undercut by the stream of hot liquid chlorides. This increases the heat transfer by removing the insulating conditions provided by the attachment of the solids and increases the removal of solids by the undercutting action.

As an example, when the chlorinator is 5.5 feet in diameter and operated at between 1,000°C and 1,020°C chlorine is introduced at the rate of 60scfm. This chlorinator maintains the ore and coke in fluidized bed conditions and 90scfm of air or nitrogen gas is also introduced to achieve proper fluidization. The ore bed consists of 80 percent ilmenite and 20 percent finely divided coke sized minus 10 mesh and plus 220 mesh. The chlorination reaction produces iron chlorides as essentially all ferrous chloride, approximately 99 percent and 1 percent ferric chloride, plus carbon dioxide and some carbon monoxide and traces of titanium tetrachloride.

The condenser employed was 6 inches in diameter and 20 feet in height and operated successfully when air cooled by exposure to ambient air at 75°F with a slight wind velocity of 5 knots. Alternatively, water was introduced around the upper outer walls of the condenser and allowed to flow down the sides. Water temperature was approximately 70°F and water flow formed a film which essentially covered the condenser.

This insured that the wall temperature was maintained below the dew point of ferrous chloride which is 980°C. Since ferrous chloride changes to a solid at 675°C and ferric chloride changes to a solid at 304°C and boils at 309°C a solid layer of sublimed ferrous chloride is first formed on the wall as a white powder then crystals of ferrous chloride are deposited and generally a layer of crystalline solids mixed with coke dust are formed and remain in an equilibrium state along the inner surfaces of the condenser wetted by a film of ferrous chloride.

The conditions described were such that a stream of ferrous chloride formed on the upper inner walls of the condenser performed a refluxing action as it flowed downwardly to increase the liquid-solid ratio to the fluid point and washed excess solids away. Because the ferrous chloride liquid flows downwardly counter-current to the gas stream it absorbs heat and becomes superheated which facilitates melting of the liquid-solid formations and also facilitates draining of the condenser vessel. Locating the condenser directly above the chlorinator enhances this refluxing action and serves to better superheat the downwardly flowing liquid.

Obviously the condenser can also be located adjacent to the reactor or vertically in any other convenient location. The reflux action can be accomplished by other types of condensers as for instance one comprising two or more sections of varying diameters to provide varying cooling temperatures to condense the iron chlorides gases at varying rates.

The embodiments of the invention in which an exclusive property or privilege is claimed are as follows:

1. In the process for the beneficiation of titaniferous ores by chlorination of iron oxides to form iron chlorides; vaporization of the resulting iron chlorides which contain entrained particulate matter; condensing the iron chlorides with a heat exchanger and collecting the condensed iron chlorides; the improvement which comprises:
  a. passing the vaporized iron chloride to a heat exchanger whereby the ferrous chloride portion condenses to liquid ferrous chloride, and
  b. conducting the liquid ferrous chloride counter-current to the direction of the vaporized iron chloride so as to continuously bathe the heat exchange surfaces with liquid ferrous chloride and thereby wash deposits of particulate matter away from the heat exchanger surface.

2. A process as in claim 1 wherein the particulate matter is ore fines and carbon dust.

3. A process as in claim 1 wherein the iron chlorides consist substantially of ferrous chloride.

* * * * *